Dec. 29, 1959 M. C. E. BATAILLE ET AL 2,919,309

ELECTRONIC FINDER

Filed July 30, 1953 2 Sheets-Sheet 1

INVENTORS
MAURICE C. E. BATAILLE
GEORGES M. PLANCHAIS

BY Robert Harding Jr.
ATTORNEY

INVENTORS
MAURICE C. E. BATAILLE
GEORGES M. PLANCHAIS
BY Robert Harding Jr.
ATTORNEY United States Patent Office 2,919,309

Patented Dec. 29, 1959

2,919,309

ELECTRONIC FINDER

Maurice Camille Eugene Bataille and Georges Maurice Planchais, Paris, France, assignors to International Standard Electric Corporation, New York, N.Y., a corporation of Delaware Application July 30, 1953, Serial No. 371,386

7 Claims. (Cl. 179—18)

Figure 1:
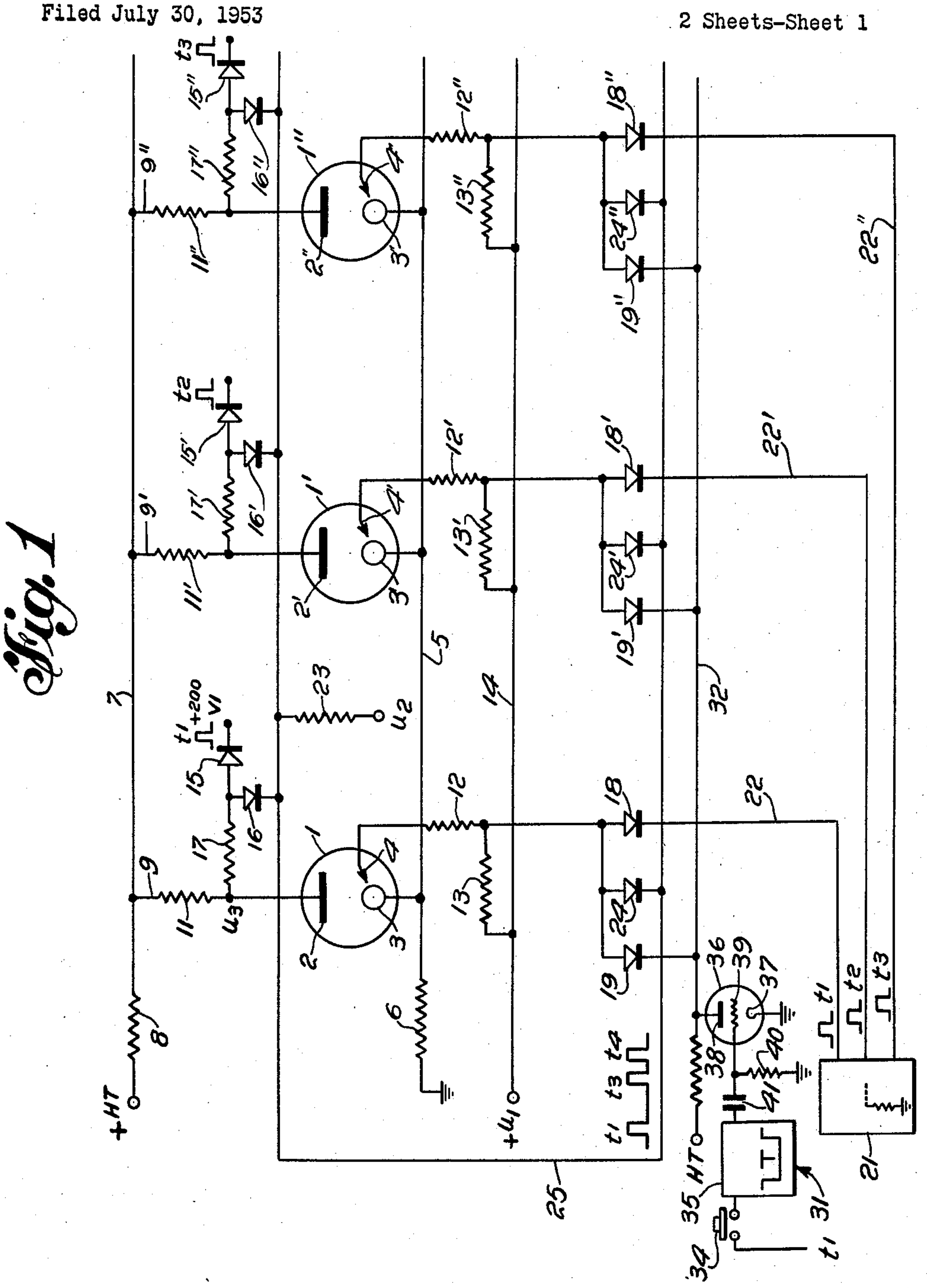

The present invention relates to an electronic finder for telephone switching systems which may be used in telephone switching systems or the like.

One object of this invention is to provide an electronic finder having a mode of operation analogous to that of the rotary switches. When a starting device operates, it scans successively a series of positions, passes over the busy positions and stops on the first free position in order to mark it as engaged. It marks it particularly as busy for the other scanning operations.

According to a feature of the invention, an electronic finder comprises: a series of gas triodes, rectifier gates controlling the triggering electrodes of said tubes, receiving in turn blocking impulses, in order to set up a triggering condition, said blocking impulses being supplied by a distributor, a busying device associated with each gate in order to render the said impulses inoperative on the busy positions, a supply circuit in which the cathodes are supplied through a common resistance, so that, when the tube is triggered, the voltage drop on this resistance prevents the triggering of the other tubes, output devices inserted in the individual circuits of the tubes, particularly in their anode wires, in order to signal the busying of the position the tube of which is triggered, and particularly in order to signal its busy state, and a starting device which, whilst it is at rest, renders inoperative the triggering conditions set up by the means stated above.

According to another feature of the invention, the gate is a coincidence gate, with a rectifier periodically blocked by the impulses supplied by the distributor, and a second rectifier successively blocked by all the series of the impulses corresponding to the free positions, so that for a busy position, the corresponding impulse is absent and there is no coincident blocking.

According to another feature of the present invention which is more particularly applied to semi-electronic switching systems, the output device may be constituted by the winding of a relay or an analogous electro-magnet. In this case, a contact of this relay may constitute the controlling element of the busying device, either by cutting the connection between the gate and the distributor, or by suppressing the corresponding impulse in the series applied to the second rectifier mentioned above, or in any other way.

According to another feature of the invention, the starting device comprises a rectifier in each gate, these rectifiers being connected in parallel in order to render inoperative the blocking of the rectifier or of the rectifiers previously mentioned, and means for applying to these new rectifiers a blocking voltage in order to establish the starting condition in which the above mentioned blocking causes the triggering of the corresponding tube.

Since the starting device may act from any moment of the distribution cycle, the first free position occurs after this moment is busied. It may be desirable in certain cases to engage the positions from a predetermined position. The invention has for an object to provide a finder capable of busying the first free position occurring from a given position.

According to another feature of this invention, the starting device comprises a triggering and a time device, the triggering of which is controlled by a periodic impulse, corresponding to the first position in the order, and the time of which is at least equal to the distribution period. In this way, the starting device which may be controlled at any moment is only operative as from the moment when the first position in the succession order is scanned, and for a time covering a scanning cycle of all the positions.

Another object of this invention is to provide a finder in which the triggered tube is re-established after a time which permits to signal the busying of the corresponding position. It will be understood that in a system in which the busying is signalled by the operation of a relay, the duration of this signal must be very long with respect to the electronic scanning time: for example 100 milliseconds with respect to 3 microseconds, that is of the order of $10^4$.

According to another feature of the invention, in order to realize this condition, the starting device is inserted in the common feeding circuit of the anodes of the triggering tubes, and it comprises a time device, so that, when the starting device has been controlled, it provides the current supply to the tubes during the time necessary for the busying signal (the time necessary for the scanning being negligible) and then suppresses it in order to re-establish the tube which had been triggered on a free position.

According to another feature of the invention, the preceding arrangement may be combined with the hunting in a predetermined order. The starting device then comprises a triggering and a time device, analogous to that mentioned above, the triggering being also controlled by the periodic impulse corresponding to the first position in the order but the time being much longer. Besides, this device comprises preferably an amplifier, since it must supply the feeding current of a tube.

Figure 2:
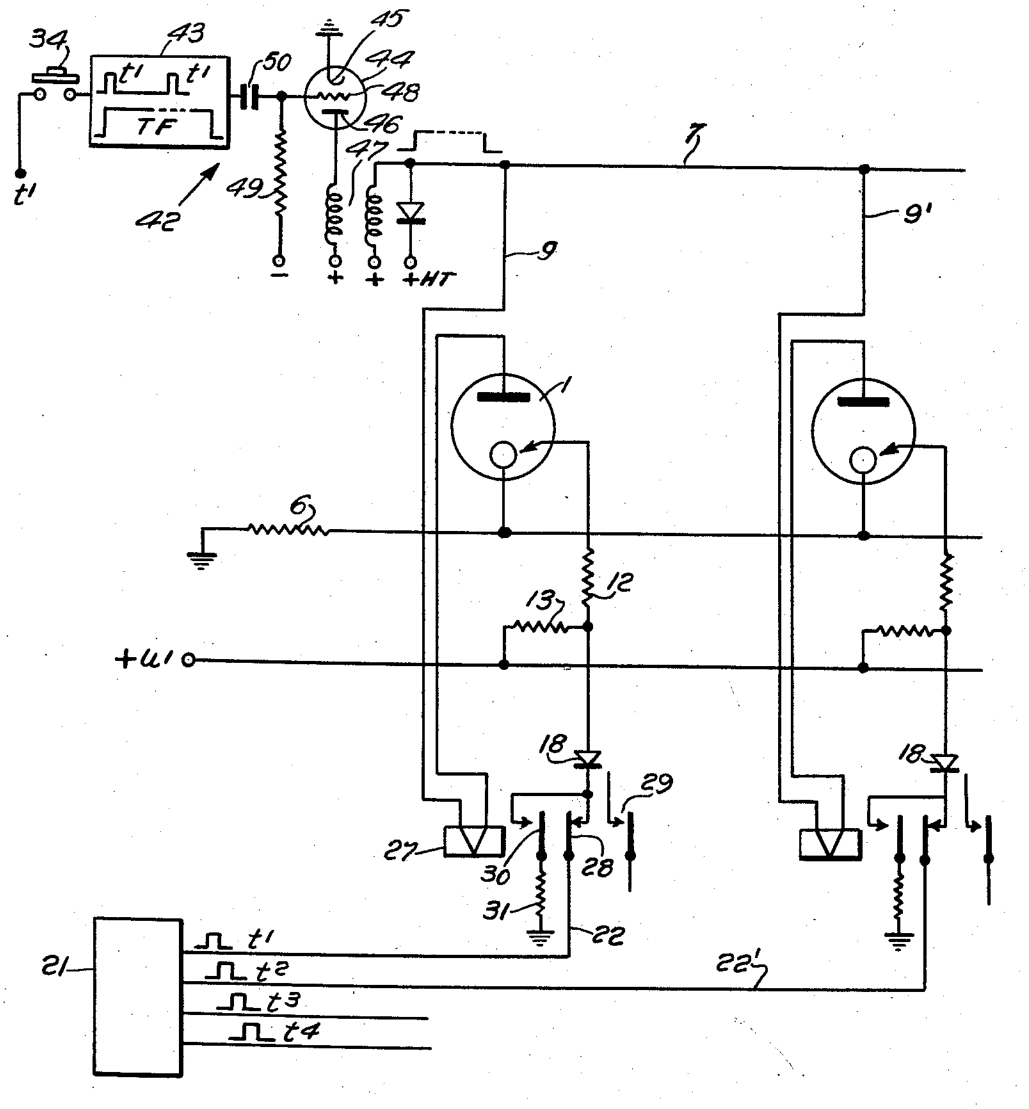

Other objects, features and advantages of the present invention will appear from a reading of the following description of an embodiment of the present invention, the said description being given in connection with the accompanying drawings in which:

Fig. 1 represents the general diagram of an electronic finder according to the invention; and Fig. 2 represents the diagram of a limited triggering finder.

The finder shown in Fig. 1 comprises essentially a series of gas triodes, connected in parallel, each one corresponding to a position which may be hunted over. For purposes of illustration, three tubes 1, 1′ and 1″ have been shown. Tube 1 comprises an anode 2, a cathode 3, and a triggering electrode 4, tube 1′, an anode 2′, a cathode 3′, and a triggering electrode 4′, and tube 1″, an anode 2″, a cathode 3″, and a trigger electrode 4″.

The cathodes are connected to a wire 5 connected to the ground through a common resistance 6. The anodes are connected to a wire 7, fed by a source of high positive voltage +HT through a common resistance 8 (which may be omitted). This supply circuit permits the triggering of any tube, but of a single one, since the current which traverses the triggered tube creates a voltage drop across the resistance 6. The potential applied to the wire 5 then becomes more positive, and the triggering voltage which may be applied to the electrode 4 of another tube is no longer capable of triggering a discharge towards its associated cathode.

In each individual anode circuit 9, 9′, 9″, is inserted an output device capable of supplying a busying signal. This device is, for example, the anode load resistance 11, 11', 11'', at the terminals of which appears a voltage when the tube is triggered, or, as it will be seen hereinafter, relay windings may be inserted for the same purpose.

The triggering electrodes of the tubes 1, 1' and 1'' are connected respectively, through resistances 12 and 13, 12' and 13', and 12'' and 13'', to a wire 14 which is connected to a positive voltage $+U_1$, sufficient for triggering the tubes when this voltage is applied to the triggering electrodes.

For tube 1, the common point of the resistances 12, 13 is connected to a rectifier gate which comprises a scanning rectifier 18 and a starting rectifier 19. Similarly, the common point of resistances 12'' and 13'', associated with tube 1', is connected to a gate comprising rectifiers 18', 19', and the common point of resistances 12'' and 13'', associated with tube 1'', is connected to a gate comprising rectifiers 18'' and 19''. Other tubes in the series would be provided with similar rectifier gates.

A distributor of the matrice type 21 applies periodically a series of positive impluses, such as impulses $t^1$, $t^2$, $t^3$, to the rectifiers 18, 18', and 18'' of the respective tubes over wires 22, 22', and 22''. These $t$ impulses, therefore, identify the tubes in the series. Appropriate distributors, of the flip-flop and of rectifier matrice types are well known in the art and need not be described here. Between the impulses, the wire are connected in the distributor through a low impedance leak to ground. In other words, ground is normally applied to wires 22, 22', and 22'', but the impulses raise the potential in a positive direction.

The leak to ground through the distributor lowers the voltage at the common points 12—13, 12'—13', and 12''—13'', and the triggering cannot take place. However, when the distributor sends a positive impulse on a particular wire 22, 22', or 22'', it blocks the corresponding rectifier 18, 18', 18'': there is no more voltage drop across the corresponding resistance 13, 13', or 13'' (leaving the other rectifier 19, 19', or 19'', out of consideration), and the corresponding tube is triggered. A tube can therefore be triggered only at the moment (periodically) when it receives its scanning impulse from the distributor over its wire 22, 22', or 22''.

The other elements of the finder circuit subordinate the triggering to three other conditions.

It has already been seen that the cathode circuit, particularly its cathode resistance 6, permits the triggering of only a single tube at a time.

It is desired to prevent the triggering of a tube which corresponds to a busy position. This is accomplished by connecting a busy rectifier 24, 24', 24'', to the corresponding trigger electrode in addition to the starting rectifier 19, 19', and 19'', and the scanning rectifier 18, 18', and 18''. The rectifiers 24, 24', 24'', of all the tubes shown are connected to a common wire 25 to which are applied periodically, in a manner to be explained, all the series of impulses $t^1$, $t^2$, $t^3$, etc., except those corresponding to busy positions. On the drawings, the second position (tube 1') is assumed to be a busy position and the impulse $t^2$ does not exist in the series. In the absence of an impulse it is again a leak to ground which takes place. A busy signal caused by current flowing in the anode circuit of a tube must cancel the corresponding impulse. The gate comprising rectifiers 18 and 24, associated with the first tube 1, is not entirely blocked until the coincidence of an impulse on wire 22, which identifies the position, and an impulse on the wire 25 which means that the position is free. Similiarly the other gates are only blocked when coincident impulses appear on wire 25 and the wire connected to the distributor.

An example of a circuit which applies to wire 25 impulses corresponding to free positions, is shown connected to the anode 2 of the triode 1 and is in the form of a gate comprising two rectifiers 15 and 16 connected to the anode by means of a resistance 17. The other tubes have corresponding resistances 17' and 17'' and rectifiers 15', 16' and 15'' and 16''.

The rectifier 15 receives the corresponding impulse $t^1$ in the absence of which a leak to ground exists; the rectifier 16 is connected to wire 25, which is connected to a source of voltage $U_2$, lower than $U_1$ by a resistance 23. Similarly rectifiers 15' and 15'' receive impulses $t^2$ and $t^3$, respectively.

When the tube 1 is not triggered and at the moment when the impulse $t^1$ blocks the rectifier 15, the voltage +HT connected to wire 7 appears as a corresponding impulse at time $t^1$ on wire 25. This is the busying signal for that position. When the tube is triggered (busy position), the voltage at a connon point 11—17 falls to a value $U_3$, which characterizes the absence of impulse. At this time the voltage on wire 25 will equal approximately the value of $U_2$. The other gate circuits associated with tubes 1' and 1'' act correspondingly.

The last triggering condition is provided by the starting device 31 which controls the rectifiers 19, 19', and 19'', by the common wire 32. At rest, the device comprises a leak to ground as will be explained, which renders ineffective the blocking of rectifiers 18, 18', and 18''. When the device is operated, as is shown in the drawing by contact 34, the wire 32 receives a positive voltage HT which blocks all the rectifiers 19, 19', 19'', at the same time. From this moment, the first outgoing impulse from the distributor for a free position, will trigger the corresponding tube.

For the hunting from a predetermined position, the control represented by contact 34 does not apply the blocking voltage immediately, but only after triggering by an impulse $t^1$ which corresponds to the first position in a sequence, and may be obtained from the distributor 21. The voltage impulse HT lasts after the $t^1$ impulse at least the time T of a scanning cycle for all the positions.

The drawing shows one embodiment of this starting device. The contact 34 applies the impulse $t^1$ (when it appears) from distributor 21 to the output of a triggering and time delay device 35 which may be for instance of a type known in the art as a "mono-stable" device. This device is triggered by the impulse $t^1$ from distributor 21 and supplies a long negative impulse T, equal in time duration to that of the entire train of $t$ impulses. The output from this device is connected to the grid 39 of a triode 36. The cathode 37 of this tube is connected to ground. The anode 38 is connected to the wire 32. The grid 39 is also connected to ground by means of a leak resistance 40 and is connected to the output of device 35 through a condenser 41.

In the absence of impulses, the tube 36, which is normally conducting, presents a leak to ground between its anode and its cathode. The starting impulse blocks this leak by rendering the tube non-conducting, and applies the HT potential to the wire 32.

In Fig. 2, there is shown an alternative arrangement in which the starting circuit controls the anode supply circuit of the tube and permits a limitation of the triggering time of a tube. The positive high tension is applied to the common anode wire 7 by a device 42, similar to the device 31 of Fig. 1. A triggering and delay device 43 will trigger after the operation of contact 34 because of the reception of the impulse $t^1$ and will supply a high voltage positive impulse of duration TF, corresponding to the time of operation of a busying signal.

The output of the device 43 is connected to a triode 44. The cathode 45 of this tube is connected to ground. The anode 46 is supplied with high voltage (+) through the primary of a transformer 47. The grid 48, biased by a negative voltage (−) through a resistance 49, is connected to the output of the device 43 through a condenser 50. A source of positive voltage (+) is connected through the secondary winding of transformer 47 and thence to wire 7. The impulse appearing in the output of secondary winding 47 is limited by means of a rectifier 51 which routes the excess of the impulse towards a source of high tension +HT.

In the absence of the impulse from device 43, the tube 44 is blocked by the grid voltage (−). This impulse TF which is supplied by the device 43 unblocks the tube which amplifies the energy passing therethrough. The transformer 47 brings the voltage of this impulse on the wire 7 to the value required for triggering the tubes.

In Fig. 2 is also shown a modified arrangement for controlling the busying functions. It comprises a relay 27 the winding of which is inserted in the anode wire 9 and the rest contact 28 controls the connection of wire 22 to rectifier 18. A make contact 29 produces the busying signal for that position. At a make contact 30 of the relay, the rectifier 18 is connected through a leak 31 to ground, the leak being equivalent to that which appears in the distributor between the impulses.

The starting circuit of Fig. 2 may, of course, be used with the busying circuit of Fig. 1, and, similarly the starting circuit of Fig. 1, may be used with the busying circuit of Fig. 2.

While the principles of the invention have been described above in connection with specific embodiments and particular modifications thereof, it is clearly understood that this description is made only by way of example and not as a limitation on the scope of the invention.

What is claimed is:

1. An electronic finder for telephone switching systems comprising a plurality of gas discharge devices connected in parallel and each one representing a position of said finder, each device having an anode, a cathode, and a triggering electrode, energizing means common to said devices for normally applying a voltage between the cathodes and anodes of said devices insufficient to trigger said devices but sufficient to maintain a discharge in a device, triggering means common to said devices for normally applying a voltage between the cathodes and triggering electrodes of said devices sufficient to trigger said devices, means included in said energizing means for preventing a discharge in more than one of said devices at a time, a plurality of scanning gating circuits respectively connected to the triggering electrodes of said devices, said gating circuits being adapted to prevent the application of voltage to the associated triggering electrodes by said triggering means except when operated, means connected to each of said gating circuits for operating said circuit at periodic times characterizing the associated device and therefore a particular finder position, whereby said scanning gating circuits are operated in succession, starting means connected to said devices for preparing said devices for operation, and static voltage blocking means connected to the anode of each device for marking busy the finder position associated with any operated device.

2. An electronic finder, as defined in claim 1, in which the starting means includes means for preparing said devices for operation for a predetermined time inclusive of the successive periodic times associated with the gas discharge devices.

3. An electronic finder, as defined in claim 2, further comprising a plurality of second gating circuits connected respectively to the triggering electrodes of the discharge devices, said second gating circuits being adapted to prevent the application of voltage to the associated triggering electrodes by the triggering means except when the said gating circuits are operated, means connecting each second gating circuit with the said static voltage blocking means, means for producing pulses at the periodic times characteristic of said discharge device and for applying them to said voltage blocking means, means for disabling the said voltage blocking means when said device is not discharging, and means for causing said pulses to operate said second gating circuit when the said voltage blocking means is disabled.

4. An electronic finder, as defined in claim 3, in which the starting means is connected to the triggering means and includes means for disabling said triggering means when unoperated and for enabling said triggering means when operated.

5. An electronic finder, as defined in claim 4, in which the disabling and enabling means includes an individual gate circuit connected between the starting means and each triggering electrode.

6. An electronic finder, as defined in claim 1, in which the starting means is connected to the energizing means for the gas discharge devices and includes means for preparing said devices for operation for a predetermined time inclusive of the successive periodic times associated with said devices.

7. An electronic finder for telephone switching systems comprising a plurality of gas discharge devices connected in parallel and each one representing a position of said finder, each device having an anode, a cathode, and a triggering electrode, energizing means common to said devices for normally applying a voltage between the cathodes and anodes of said devices insufficient to trigger said devices but sufficient to maintain a discharge in a device, triggering means common to said devices for normally applying a voltage between the cathodes and triggering electrodes of said devices sufficient to trigger said devices, means included in said energizing means for preventing a discharge in more than one of said devices at a time, a plurality of scanning gating circuits respectively connected to the triggering electrodes of said devices, said gating circuits being adapted to prevent the application of voltage to the associated triggering electrodes by said triggering means except when operated, means connected to each of said gating circuits for operating said circuit at periodic times characterizing the associated device and therefore a particular finder position, whereby said scanning gating circuits are operated in succession, starting means connected to said devices for preparing said devices for operation, said starting means including means for preparing said devices for operation for a predetermined time inclusive of the successive periodic times associated with said devices, busying-signalling-producing means comprising a relay having a winding in the anode circuit of said device, a set of contacts adapted when closed to indicate the busy condition, and another set of contacts adapted to disable the triggering electrode circuit of said device when said relay is operated.

References Cited in the file of this patent

UNITED STATES PATENTS

| | | |
|---|---|---|
| 2,489,325 | Ridler | Nov. 29, 1949 |
| 2,542,672 | Hecht | Feb. 20, 1951 |
| 2,561,051 | Den Hertog | July 17, 1951 |
| 2,594,389 | Bruce | Apr. 29, 1952 |
| 2,622,153 | Schuler | Dec. 16, 1952 |
| 2,629,020 | Robertson | Feb. 17, 1953 |
| 2,773,937 | Morris | Dec. 11, 1956 |